United States Patent
Welter

(10) Patent No.: US 7,329,368 B2
(45) Date of Patent: Feb. 12, 2008

(54) TEMPERATURE COMPENSATING CHIRAL DOPANTS

(75) Inventor: Thomas R. Welter, Webster, NY (US)

(73) Assignee: Industrial Technology Research Institute, Chutung, Hsinchu (TW)

( * ) Notice: Subject to any disclaimer, the term of this patent is extended or adjusted under 35 U.S.C. 154(b) by 217 days.

(21) Appl. No.: 11/296,914

(22) Filed: Dec. 8, 2005

(65) Prior Publication Data

US 2007/0131901 A1    Jun. 14, 2007

(51) Int. Cl.
C09K 19/52 (2006.01)
C09K 19/58 (2006.01)
C09K 19/38 (2006.01)
C07C 69/76 (2006.01)

(52) U.S. Cl. .................... 252/299.01; 428/1.3; 560/80; 560/100

(58) Field of Classification Search ................ 428/1.3; 252/299.01, 299.62, 299.67, 299.7; 560/80, 560/100

See application file for complete search history.

(56) References Cited

U.S. PATENT DOCUMENTS

| | | | |
|---|---|---|---|
| 3,945,968 A | 3/1976 | Goletto | |
| 4,346,167 A | 8/1982 | Imatomi et al. | |
| 4,895,793 A | 1/1990 | Seto et al. | |
| 5,053,555 A | 10/1991 | Yeager et al. | |
| 5,309,265 A | 5/1994 | Buchecker et al. | |
| 5,695,682 A | 12/1997 | Doane et al. | |
| 6,236,442 B1 | 5/2001 | Stephenson et al. | |
| 7,052,743 B2 * | 5/2006 | Welter et al. | 428/1.1 |
| 7,123,335 B2 * | 10/2006 | Chari et al. | 349/169 |
| 7,150,900 B2 * | 12/2006 | Welter | 428/1.3 |
| 7,214,834 B2 * | 5/2007 | Welter | 568/719 |
| 2005/0127327 A1 | 6/2005 | Welter | |
| 2006/0091357 A1 | 5/2006 | Welter et al. | |

FOREIGN PATENT DOCUMENTS

| | | |
|---|---|---|
| EP | 0 307 951 | 3/1989 |
| JP | 9-244231 | 9/1997 |
| WO | 2005/023742 | 3/2005 |

OTHER PUBLICATIONS

JP 9-244231—Chemical Abstract.
J. Am. Chem. Soc., vol. 105, No. 25, 1983, Gottarelli et al. "Induction of Cholesteric Mesophase".
Birman, Vladimir B. et al: "1,1'-Spirobiindan-7,7' -diol: a novel, C2-symmetric chiral ligand" Tetrahedron: Asymmetry, 10(1), 125-131 CODEN: TASYE3; ISSN: 0957-4166, 1999, XP002315481 p. 126, Scheme 1, e.g. compounds 14 to 16; p. 127, compounds 16 to 19; Scheme 2; p. 130, item 3.9.
Database Beilstein, Institut zur Forderung der Chemischen, Wissenschaften, Frankfurt am Main, DE; XP002315483, Database accession No. BRN 2034658, abstract & Blatchly et al.: "Thiele-Winter Acetoxylation of Quinones. Part IV. Quinones containing One or More t-Butyl Groups" J. Chem. Soc. Perkin Trans. 1, 1972, pp. 2286-2291, XP009043084.
Database CA Online, Chemical Abstracts Service, Columbus, Ohio, US; Tan, Shiro et al: "Novel diazonaphthoquinone photoactive compound for g-line/i-line compatible positive photoresist," XP002315484, retrieved from STN, Database accession No. 1990:601153, abstract, and Proceedings of SPIE-The International Society for Optical Engineering, 1262 (Adv. Resist Technol. Process. 7), 513-26 CODEN: PSISDG; ISSN: 0277-786X, 1990.
Database CA Online, Chemical Abstracts Service, Columbus, Ohio, US; Sanchez-Viesca, F. et al: "Preparation and spectroscopy study of 4,4', 6,6',7,7'-hexamethoxy-3, 3, 3', 3'-tetramethyl-1, 1'-spiro-bis-hydrinden" XPOO2315485, retrieved from STN, Database accession No. 1981 : 461829, abstract, and Revista Latinoamericana de Quimica, 12(1), 27-9 CODEN: RLAQA8; ISSN; 0370-5943, 1981.
Dtabase CA Online, Chemical Abstracts Service, Columbus, Ohio, US; Uenishi, Kazuya et al: "Structural effects of diazonaphthoquinonephotoactive compound backbone on resist lithographic properties," XP002315486, retrieved from STN, Database accession No. 1991:690953, abstract, and Proceedings of SPIE-The International Society for Optical Engineering, 1566 (Adv. Resist Technol. Process. 8), 102-16 CODEN: PSISDG; ISSN: 0277-786X, 1991.

Zhou, Hai et al: "Highly Enantioselective Copper-Catalyzed Conjugate Addition of Diethylzinc to Enones Using Chiral Spiro Phosphoramidites as Ligands," Journal of Organic Chemistry, 68(4), 1582-1584 CODEN: JOCEAH; ISSN: 0022-3263, vol. 68, No. 4, 2003, pp. 1582-1584, XP002315482, p. 1582, FIGURE 1; sCHEME 1; ABSTRACT.
CAPLUS 1969: 114866.

\* cited by examiner

*Primary Examiner*—Shean C. Wu
(74) *Attorney, Agent, or Firm*—Akin, Gump, Strauss, Hauer & Feld LLP

(57) ABSTRACT

The present invention relates to a chiral compound, and an article utilizing the same, represented by the following structures I-1, I-2, I-3, or 1-4:

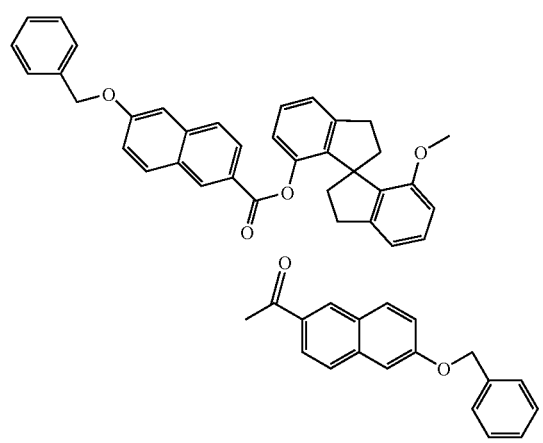

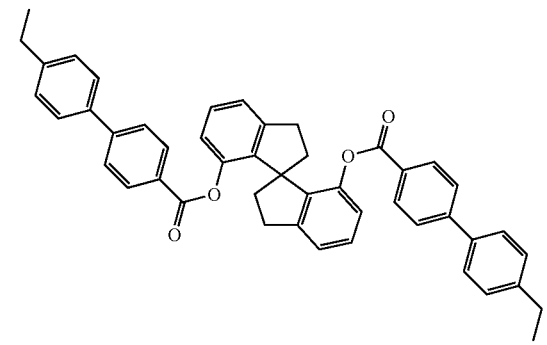

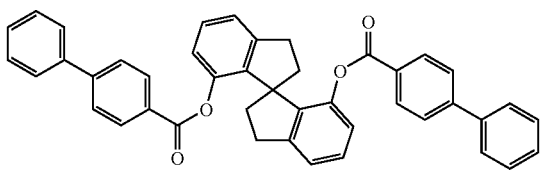

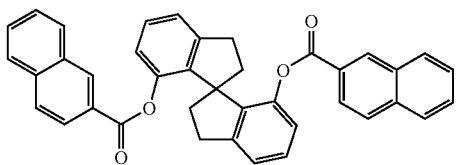

wherein the chiral compound demonstrates thermochromic temperature insensitivity.

40 Claims, 2 Drawing Sheets

TEMPERATURE COMPENSATING CHIRAL DOPANTS

FIELD OF THE INVENTION

The present invention relates to novel, nonracemic compounds for use as chiral dopants, preferably in liquid crystal displays.

BACKGROUND OF THE INVENTION

There is continuing interest in the development and manufacturing of inexpensive, bi-stable, color, chiral nematic liquid (LC) crystal displays, e.g. see *Flexible Flat Panel Displays*, Gregory Crawford (Editor) ISBN: 0-470-87048-6. Typically, chiral nematic (cholesteric) liquid crystal formulations useful for such applications must, among other attributes, reflect a wide bandwidth of visible light, switch between mesogenic states at accessible voltages, be environmentally stable toward degradation, and remain useful and stable over a wide temperature range. It is widely understood that development of a chiral nematic liquid crystal mixture, capable of its many necessary functions, is accomplished in two stages: first a nematic liquid crystal mixture that has most of the desired properties, e.g. electrical anisotropy, birefringence, viscosity, mesophase temperature range etc., is devised. Secondly, a chiral dopant is added to induce the helical twisting of the nematic liquid crystal phase forming the reflective chiral nematic liquid crystal mesophase. Most commonly, the introduction of the chiral dopant adversely affects the performance of the nematic mixture, perhaps reducing the birefringence, increasing the viscosity, or narrowing the useful temperature range of the mesophase. Using only small amounts of dopants can often minimize such problems.

Dopants capable of inducing chiral nematic formation at low concentration are termed high-twist dopants. The figure of merit for chiral dopants is their helical twisting power (HTP), which describes the amount of helical twist induced in a particular nematic liquid crystal by a unit weight or molar concentration of the dopant: HTP (or $\beta$)=$(c\ p\ r)^{-1}$ where c is the dopant concentration, usually as a weight or mole fraction; p is the chiral nematic liquid crystal pitch, usually expressed in microns; and r is the dopant enantiomeric excess, a dimensionless number describing the enantiomeric purity of the dopant. Beyond these factors, HTP values are dependent on the nature of the dopant structure, host nematic liquid crystal composition, and temperature among other factors. Attempts to develop a new chiral nematic mixture, for a use in chiral nematic liquid crystal displays, has centered upon identification of novel chiral dopants. The co-pending application WO2005023742A2 (A2, A3), incorporated herein by reference, describes a new class of useful chiral dopants. While dopants of this class are generally useful, they can display significant deficiencies. For instance, it has been found that displays prepared employing some examples of this dopant class can show unacceptable color changes as a function of ambient temperature.

The temperature sensitivity of chiral nematic displays has been noted previously and novel solutions developed to ameliorate such defects: e.g. Schadt, et al., (U.S. Pat. No. 5,309,265) describe the use of combinations of chiral dopants with both positive and negative thermochromic slopes (S). An appropriate combination near ideal temperature-insensitivity can be obtained with this approach. Necessarily this approach to temperature compensation requires the use and manufacture of multiple dopants.

PROBLEM TO BE SOLVED

There remains a need for temperature independent chiral dopants.

SUMMARY OF THE INVENTION

The present invention relates to a chiral compound, and an article utilizing the same, represented by the following structures I-1, I-2, I-3, or I-4:

I-1

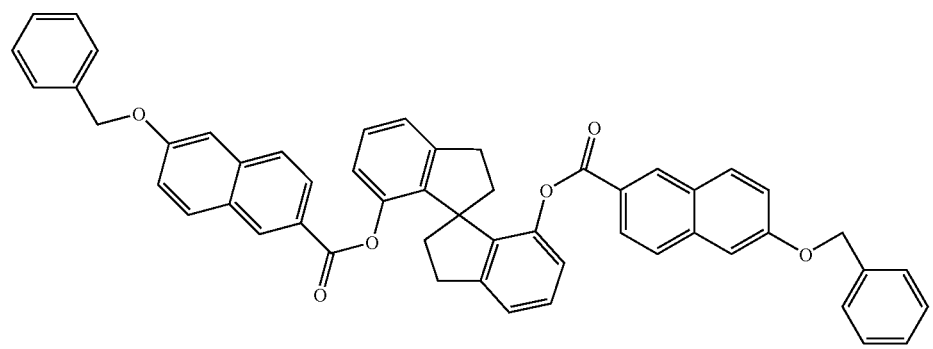

-continued

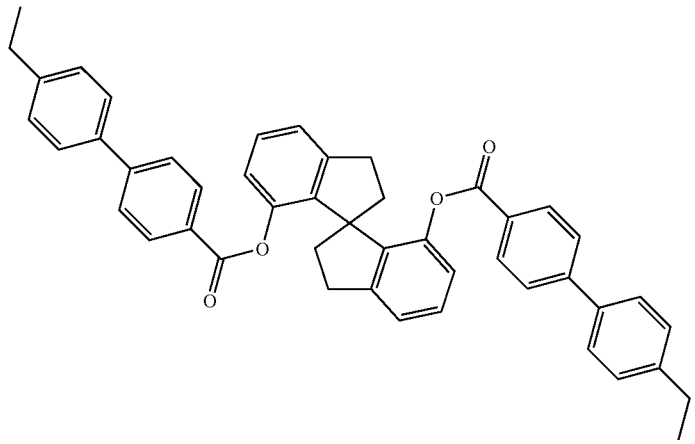

I-2

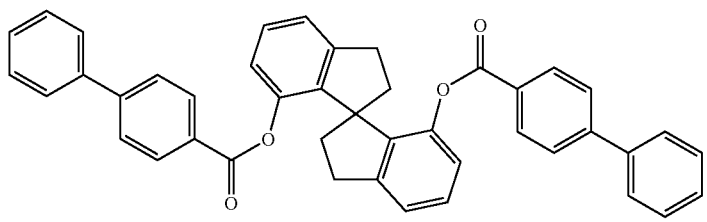

I-3

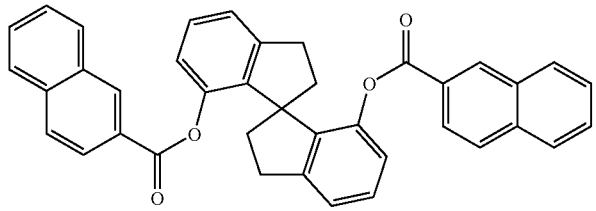

I-4 wherein the chiral compound demonstrates very substantially improved thermochromic temperature insensitivity.

ADVANTAGEOUS EFFECT OF THE INVENTION

The present invention includes several advantages, not all of which are incorporated in a single embodiment. In particular, compounds of the invention afford very substantially improved thermochromic temperature insensitivity.

DETAILED DESCRIPTION OF THE INVENTION

Figure 1:
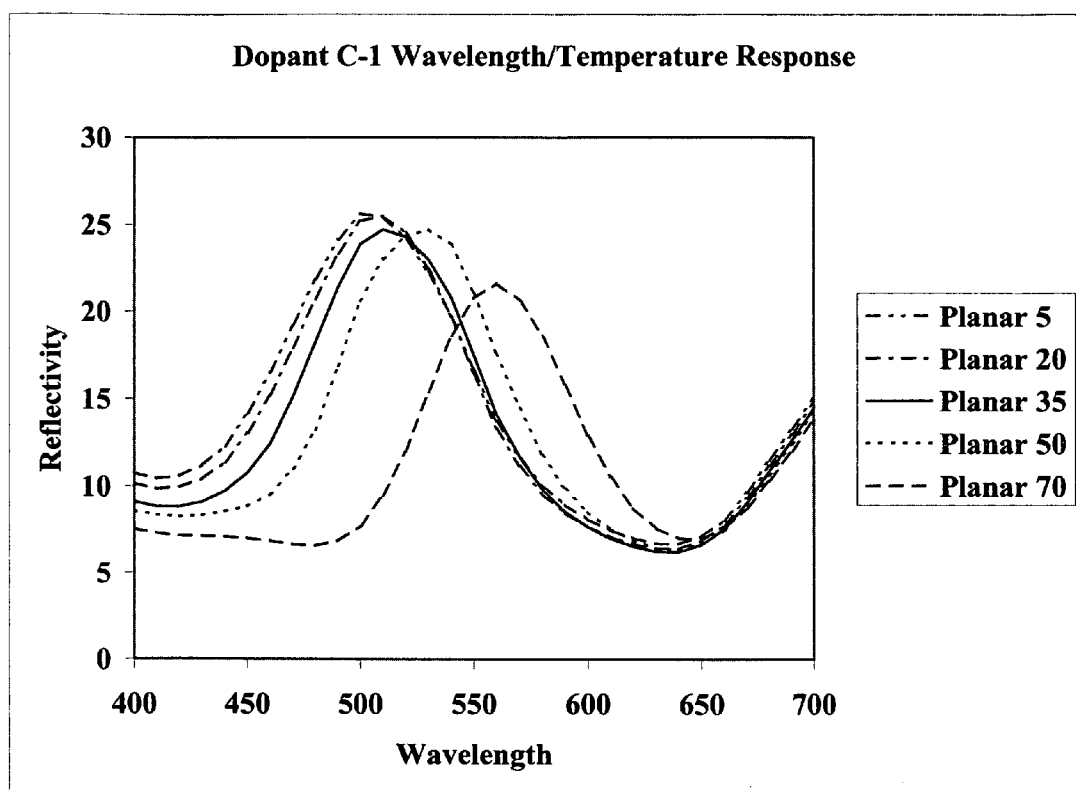
FIG. 1 represents the Glass Cell Thermal Response for Dopant C-1 in BL087.

The dopants used to prepare chiral nematic liquid crystal mixture can impart thermal instabilities to those mixtures. Often the heating or cooling of the chiral nematic mixture causes shifts in the reflected color. These shifts are quite unpredictable. That is, a given dopant in a particular host mesophase may cause a bathochromic shift upon heating, while a structurally similar compound under similar heating may produce a hypsochromic shift in reflection in that host. The degree to which a dopant shifts color with temperature change can also differ significantly within a given dopant class. Some dopants engender virtually no thermotropic temperature changes. Others can cause very large color shifts. Most typically, particularly for display uses, one would prefer that the color of the reflection not shift with temperature. One method of assessing these thermotropic color shifts is consideration of the rate of color change with temperature. Thus, a plot of the maximum wavelength of display reflection versus display temperature (over a range of 5-50° C.) has been found to be roughly linear. The slope of that linear response (Δ wavelength/Δ temperature) then provides a measure of liquid crystal derived temperature sensitivity, the thermochromic slope (S). Materials with ideal temperature insensitivity would have a slope of zero, while less ideal materials could show either positive or negative slopes. From a practical point of view, all materials show deviations from ideal behavior. It has been determined that chiral nematic formulations that have the absolute values of their thermochromic slope (|S|) less than or equal to 0.3 nm/° C. are useful.

Certain chiral dopants compounds represented by Structures I-1, I-2, I-3, and I-4 in Table B, have been identified, which demonstrate substantially improved thermochromic temperature insensitivity. In particular, the enantiomerically enriched form of such compounds, including the substantially enantiomerically pure form, introduced into nematic compositions, afford useful chiral nematic mixtures.

based on the total weight of the liquid crystal composition, preferably 0.5 to 10 weight percent, more preferably 1 to 6

TABLE B

Compounds of the Invention:

I-1
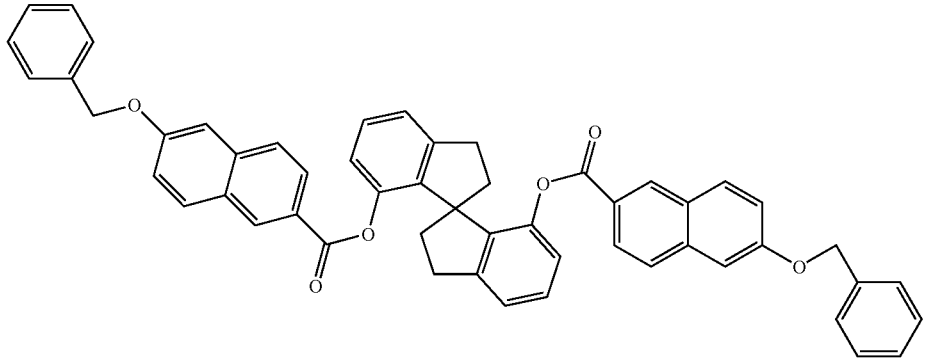

I-2
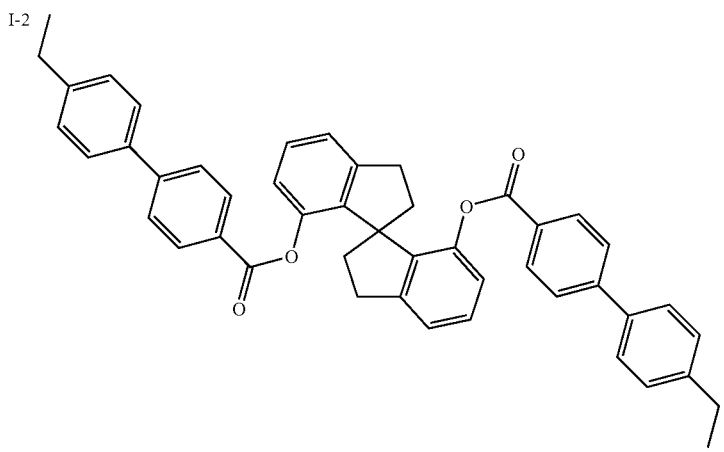

I-3
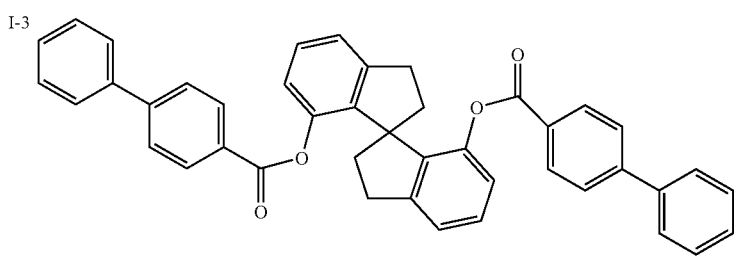

I-4
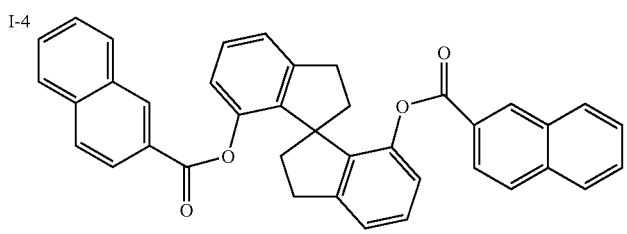

Compounds of the present invention, used in a non-racemic mixture or with an enantiomeric excess of one enantiomer, are useful as chiral dopants in liquid crystal compositions in an effective amount. One or more chiral dopants can be used cumulatively in an effective amount, or combined with other types of dopants. Suitably, the compound can be used in the amount of 0.1 to 20 weight percent, weight percent. Preferably the non-racemic mixture comprises at least 60 weight percent of one of the enantiomers, based on the weight of both enantiomers, preferably at least 80 weight percent, more preferably greater than 90 weight percent. The enantiomeric excess is greater than 0, preferably greater than 0.6. Most preferably the non-racemic mixture is a substantially or essentially pure enantiomer. The more pure the enantiomer, the less chiral dopant necessary to obtain the desired HTP and, hence, less chance of incompatibilities or adversely affecting the desired anisotropic properties of the liquid crystal composition.

Preferably the HTP, on a dopant mole fraction basis, when used in a particular liquid crystal composition, is greater than 80, more preferably at least 100, most preferably greater than 100.

Compounds of this invention can be readily prepared by those skilled in the art employing standard chemical transformations. Further these materials can be isolated in enantiomerically pure using standard methods including but not limited to: chiral HPLC, chiral synthesis, chemical or chromatographic separation of chiral derivatives of the spirophenol, e.g. via diastereomeric esters, urethanes, carbonates, and the like.

The use of chiral compounds of the present invention, or a polymerized form thereof, in admixture with a liquid crystal material, can be used for a wide variety of uses, including displays, polarizers, color filters, non-absorptive color filters, liquid crystal pigments for decorative or security purposes or coatings, optical switching, and optical information storage. For example, compositions according to the present invention can be used for making interference pigments with a viewing angle-dependent color impression in printing inks and surface coatings. The compounds of the present invention can also be used in diagnostic, medical, or cosmetic compositions. For example, liquid crystal compositions in accordance with the present invention can be used to detect body temperature or to protect the human skin or hair from UV radiation.

The liquid crystalline composition can comprise STN, TN, chiral nematic, and ferroelectric materials or compounds. Preferably, the material comprises one or more liquid crystal compounds forming a chiral nematic material. The composition can be coated on a substrate, for example, during the manufacture of a display comprising the coated substrate. In one embodiment of a display, the liquid crystalline composition is disposed between first and second electrodes, wherein the chiral compound according to the present invention is a chiral dopant in liquid crystals.

Novel liquid crystalline compositions contain one or more chiral compounds as chiral dopants, usually in concentrations of from 0.1 to 10% by weight, based on the total amount of the liquid crystal. The concentration can be selected so that the desired interference hue is formed. Higher concentrations shift the hue into the blue region, and lower ones shift it into the red region.

Preferably, the liquid crystal mixture comprises 2 to 25 compounds, preferably 3 to 15 compounds. Particularly suitable liquid crystalline compositions are those in which the achiral liquid crystalline compounds comprise cyclic compounds, for example biphenyls, as will be appreciated by the skilled artisan. Suitable liquid crystalline compounds are well known to the skilled artisan. The liquid crystalline compositions can advantageously be used for coating substrates. Examples of suitable substrates are metal surfaces, plastic surfaces, glass or ceramic surfaces or films. Furthermore, the novel liquid crystalline compositions can be used for the preparation of liquid crystal displays. To this end, the compositions are, for example, applied to a substrate, preferably a polymeric film, if desired by knife coating or other physical influences. One embodiment of a display in which domains of a cholesteric liquid crystal composition are dispersed in a polymeric matrix, disposed between electrodes is, for example, disclosed in U.S. Pat. No. 6,236,442 to Stephenson et al. and U.S. Pat. No. 5,695,682 issued Dec. 9, 1997 to Doane et al., the disclosures of which are incorporated by reference. In one embodiment, a display comprises: (a) a flexible transparent support; (b) a patterned first conductor layer comprising transparent first conductors; (c) a patterned second conductor layer comprising second optionally transparent conductors; and (d) at least one imaging layer comprising domains of polymer-dispersed chiral nematic (cholesteric) liquid crystal material dispersed in a continuous polymeric matrix, the imaging layer disposed between the first and second conductors. Such chiral nematic liquid crystal material can exhibit two contrasting stable states, a reflecting planar state and a light-transmissive focal conic state, which two states can be switched from one to the other by application of suitable voltages.

EXAMPLES

The temperature sensitivities of the new dopants, as chiral nematic liquid crystal formulations, were evaluated in a glass cell format. Liquid crystal materials are often evaluated in glass cells. In the current case, these cells consist of two glass plates cemented together but separated by five-micron spacers (purchased from the Liquid Crystal Institute (LCI) at Kent State University in Kent, Ohio.). As provided, the inside surfaces of the cell plates are coated with a transparent ITO electrode under an unbuffed polyimide alignment layer. Using well-known, standard techniques, the narrow gap of the cell is filled with liquid crystal material in a vacuum-filling device. The filled cells are than loaded into a thermostatically controlled test apparatus and connected to electrodes. Once thermally equilibrated to the necessary temperature, voltages can be applied across the liquid crystal cell to assess a material's optoelectrical response. Using suitable electronic drive-schemes, the cells can be brought to a uniform planar liquid crystal texture. The reflectance spectra of the cells are then recorded. The drive-schemes use various field voltages applied over various temporal sequences and at a range of AC frequencies. The reflection color of the planar texture as a function of device temperature can then be appraised.

For these evaluations, various dopants were dissolved in the commercial nematic BL087 (available from Merck KGaA, Darmstadt Germany) at a concentration, based on their HTP's, such that the chiral nematic mixture reflected light near 540±3 nm at room temperature. The mixtures were vacuum filled into the glass cells and equilibrated to the desired temperature. Using the standard apparatus and protocols, the visible reflectance spectra of the chiral nematic formulations, in uniform planar textures, were measured at a series of temperatures, 5°, 20°, 35°, 50° and 70° C. The current standard testing apparatus uses an X-Rite densitometer, which employs a perpendicular light source with reflection detection at a 45° angle to the normal, to record liquid crystal-cell reflections. The data was used to generate the spectral responses. A spectral plot of a cell's planar reflectivity (percent reflection versus wavelength) at various temperatures is indicative of its thermal behavior, FIG. 1.

Figure 2:
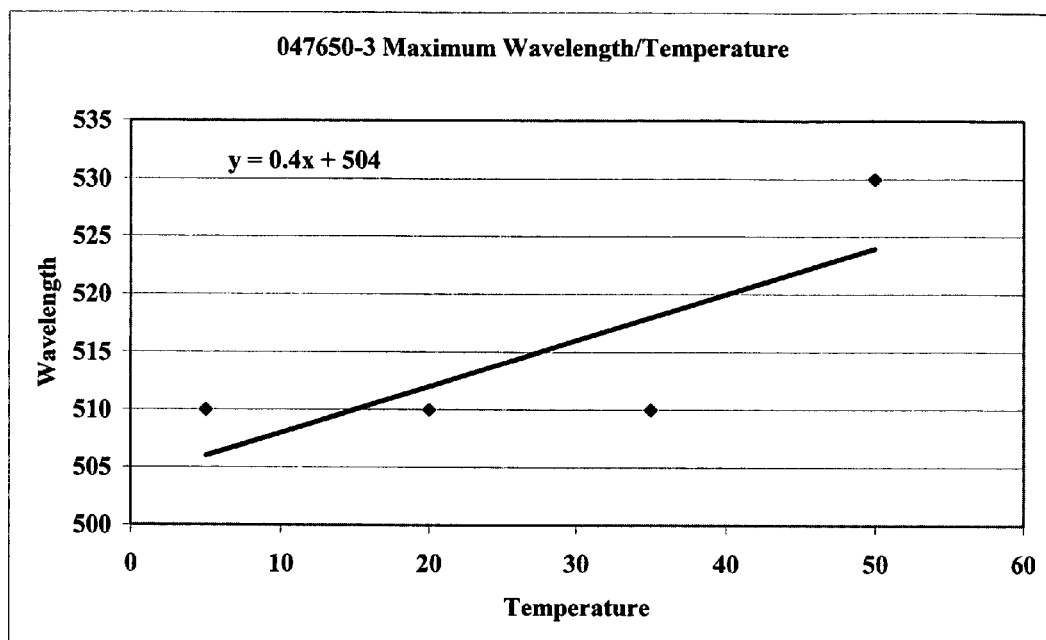
FIG. 2 represents the Maximum Reflectivity versus Temperature curve for Dopant C-1 in BL087.

From these data, wherein each curve represents a different testing temperature, it is evident that the formulation with comparative dopant C-1 imparts a bathochromic shift in maximum reflectivity with increasing temperature. A plot of the maximum spectral reflection wavelength versus temperature summarizes these data, FIG. 2. Continuing analysis of such data for the several dopants of this study indicated that thermal responses at 70° C. were unreliable and probably not relevant to envisage uses of these nematic materials, thus were dropped from these analyses. The plot in FIG. 2 then describes the thermally induced color shift for the dopant C-1. One sees little shift at the lower temperatures, with more at 50° C. These data may be simply summarized as the slope of the least-squares line as indicated in FIG. 2.

TABLE A

Comparative Dopants:

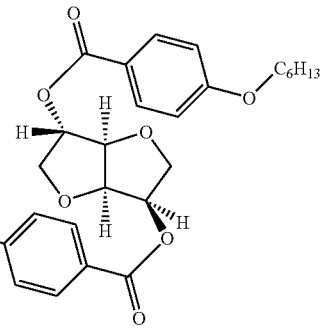

Compounds of the invention (I-1, I-2, I-3 and I-4) were prepared via acylation of enantiomerically pure (enantiomeric excess >98%) 1,1'-spirobiindane-7,7'-diol (Int-1) with the requisite acid chloride as shown in Scheme 1 and detailed in Example 1. The preparation of enantiomerically pure Int-1 was described in the previous disclosure WO2005023742A2(A2, A3).

Scheme 1.
Preparation of Dopant I-3.

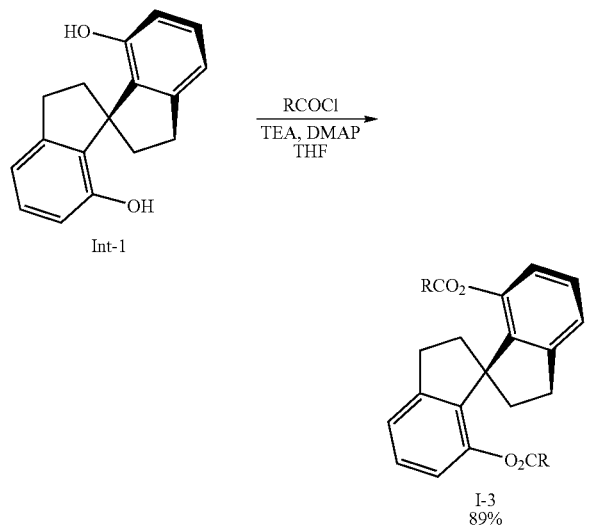

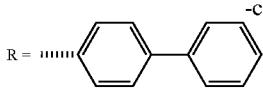

The following examples are provided to illustrate the invention.

Example 1

A solution of nonracemic (EE>98%) diol Int-1 (12.6 g, 50.0 mmol) and 4-biphenylcarbonyl chloride (97% Aldrich Chemical Co.; 23.8 g, 110 mmol) in 200 mL THF was chilled in an ice bath to an internal temperature of ≦5° C. This solution was first then treated with DMAP (0.6 g, 5 mmol) followed by dropwise addition of triethylamine (17.5 mL, 126 mmol) over 15 min. Subsequent to these additions, a mildly exothermic reaction ensues, with the formation of a precipitate. The reaction temperature remained below 10° C. The reaction was stirred at reduced temperature for 1 hour, and then was diluted by the addition of 50 mL 10% hydrochloric acid, 50 mL saturated brine and 100 mL ethyl acetate. The organic layer was separated and was washed sequentially with 100 mL cold 5% aqueous sodium hydroxide then with 100 mL one-half saturated brine (50 mL saturated brine plus 50 mL distilled water). The organic layer was dried with sodium sulfate, filtered and concentrated in vacuo. The resulting solid was dissolved in warm 200 mL THF. The hazy solution was filtered through diatomaceous earth, and concentrated in vacuo. Propionitrile (50 mL) was flashed off to provide a colorless solid. This solid was recrystallized from 200 mL propionitrile, cooling to ambient temperature with stirring, to provide after filtration, washing with minimal propionitrile and IPE and air-drying, the desired nonracemic dopant as a colorless solid, mp 164-165° C., in 89% yield.

Example 2

Thermochromic evaluations, as described above, were performed on both a comparative dopants C-1 and C-2 and dopants of the invention (I-1, I-2, I-3 and I-4). These data, in the form of thermochromic slopes, are tabulated below, Table 2.

TABLE 2

Thermochromic Slopes for Chiral Dopants.

| Dopant | Thermochromic Slope (nm/° C.) | BL087 HTP ($\mu^{-1}$) |
|---|---|---|
| Comparative: | | |
| C-1 | 0.40 | 0.5 |
| C-2 | 0.40 | 0.7 |
| Invention: | | |
| I-1 | −0.27 | 0.7 |
| I-2 | −0.20 | 0.8 |
| I-3 | 0.20 | 0.8 |
| I-4 | 0.27 | 0.5 |

Compounds of the invention display thermochromic slopes much lower than that of the comparative examples.

The invention has been described in detail with particular reference to certain preferred embodiments thereof, but it will be understood that variations and modifications can be effected within the spirit and scope of the invention.

The invention claimed is:

1. A chiral compound represented by the following structure I-1,

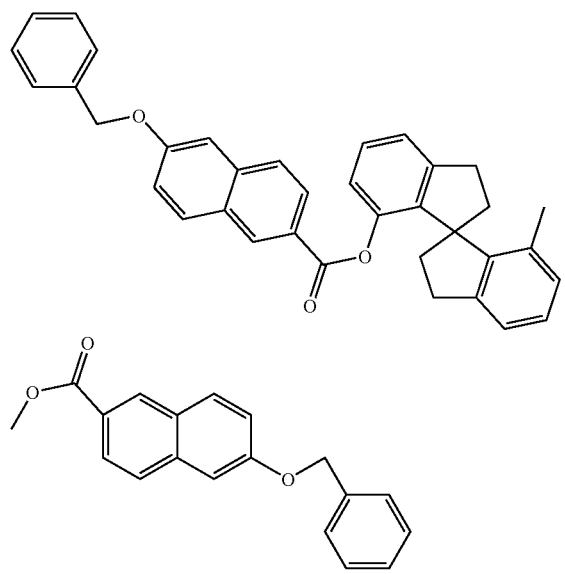

I-1 wherein:
said chiral compound demonstrates thermochromic temperature insensitivity.

2. The chiral compound of claim 1 wherein said chiral compound, when combined with a host mesophase, has a thermochromic slope (|S|) with an absolute value of less than or equal to 0.3 nm/° C.

3. A chiral compound represented by the following structure I-2:

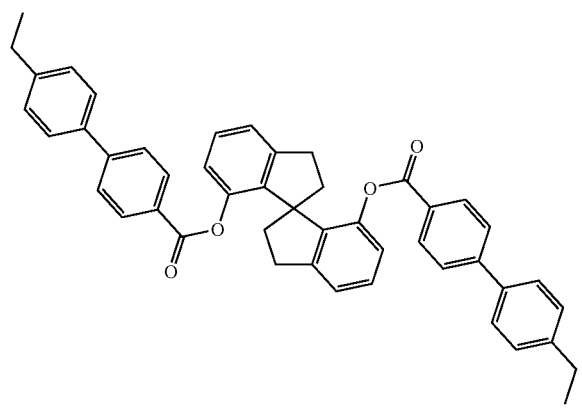

I-2 wherein:
said chiral compound demonstrates thermochromic temperature insensitivity.

4. The chiral compound of claim 3 wherein said chiral compound, when combined with a host mesophase, has a thermochromic slope (|S|) with an absolute value of less than or equal to 0.3 nm/° C.

5. A chiral compound represented by the following structure I-3:

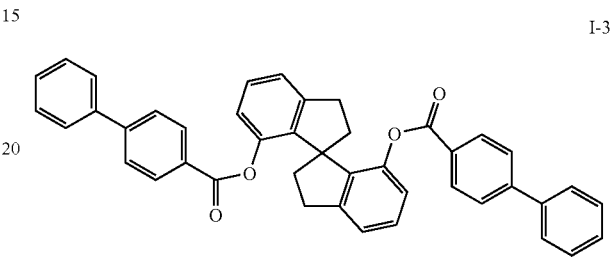

I-3 wherein:
said chiral compound demonstrates thermochromic temperature insensitivity.

6. The chiral compound of claim 5 wherein said chiral compound, when combined with a host mesophase, has a thermochromic slope (|S|) with an absolute value of less than or equal to 0.3 nm/° C.

7. A chiral compound represented by the following structure I-4:

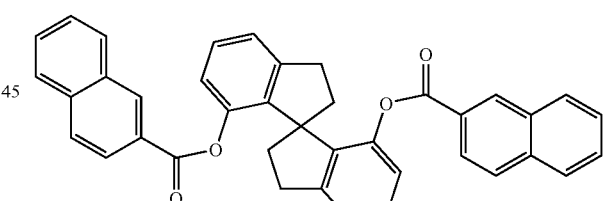

I-4 wherein:
said chiral compound demonstrates thermochromic temperature insensitivity.

8. The chiral compound of claim 7 wherein said chiral compound, when combined with a host mesophase, has a thermochromic slope (|S|) with an absolute value of less than or equal to 0.3 nm/° C.

9. An article comprising a substrate and a liquid crystalline layer coated thereon, wherein said liquid crystalline layer comprises a nematic host and a thermochromic temperature insensitive chiral dopant represented by the following structures I-1:

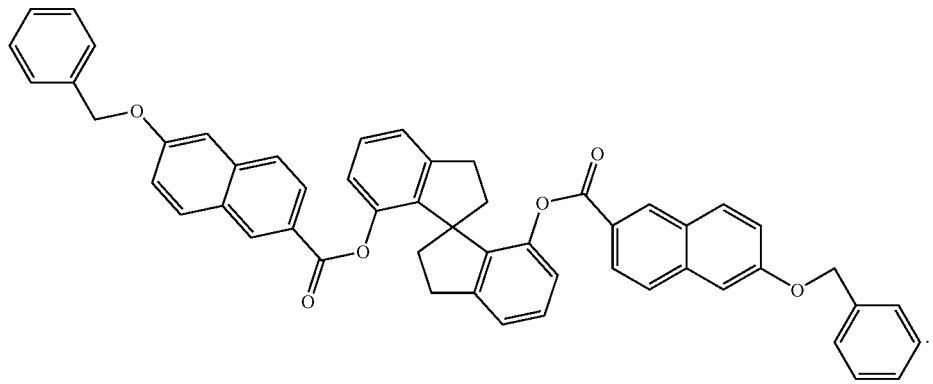

I-1

10. The article of claim 9 wherein said liquid crystalline layer further comprises a polymer binder in which domains of the liquid crystal are dispersed.

11. The article of claim 9 wherein said nematic host is chiral nematic, or ferroelectric.

12. The article of claim 9 wherein the nematic host is chiral nematic.

13. The article of claim 9 further comprising additional types of dopants.

14. The article of claim 9 wherein said substrate is transparent.

15. The article of claim 9 further comprising a transparent first conductive layer between said substrate and said liquid crystalline layer.

16. The article of claim 15 further comprising at least a second electrically conductive layer, wherein said liquid crystalline layer is between said first transparent conductive layer and said second conductive layer.

17. An article comprising a substrate and a liquid crystalline layer coated thereon, wherein said liquid crystalline layer comprises a nematic host and a thermochromic temperature insensitive chiral dopant represented by the following structure I-2:

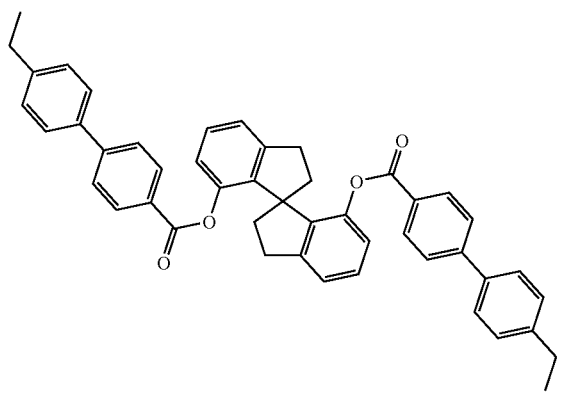

I-2

18. The article of claim 17 wherein said liquid crystalline layer further comprises a polymer binder in which domains of the liquid crystal are dispersed.

19. The article of claim 17 wherein said nematic host is chiral nematic, or ferroelectric.

20. The article of claim 17 wherein the nematic host is chiral nematic.

21. The article of claim 17 further comprising additional types of dopants.

22. The article of claim 17 wherein said substrate is transparent.

23. The article of claim 17 further comprising a transparent first conductive layer between said substrate and said liquid crystalline layer.

24. The article of claim 23 further comprising at least a second electrically conductive layer, wherein said liquid crystalline layer is between said first transparent conductive layer and said second conductive layer.

25. An article comprising a substrate and a liquid crystalline layer coated thereon, wherein said liquid crystalline layer comprises a nematic host and a thermochromic temperature insensitive chiral dopant represented by the following structure I-3:

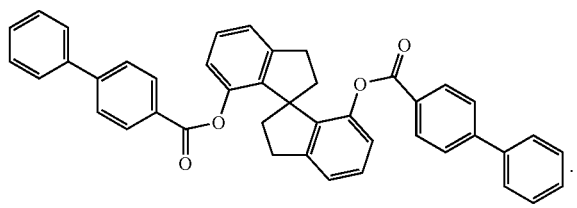

I-3

26. The article of claim 25 wherein said liquid crystalline layer further comprises a polymer binder in which domains of the liquid crystal are dispersed.

27. The article of claim 25 wherein said nematic host is chiral nematic, or ferroelectric.

28. The article of claim 25 wherein the nematic host is chiral nematic.

29. The article of claim 25 further comprising additional types of dopants.

30. The article of claim 25 wherein said substrate is transparent.

31. The article of claim 25 further comprising a transparent first conductive layer between said substrate and said liquid crystalline layer.

32. The article of claim 31 further comprising at least a second electrically conductive layer, wherein said liquid crystalline layer is between said first transparent conductive layer and said second conductive layer.

33. An article comprising a substrate and a liquid crystalline layer coated thereon, wherein said liquid crystalline layer comprises a nematic host and a thermochromic temperature insensitive chiral dopant represented by the following structure I-4:

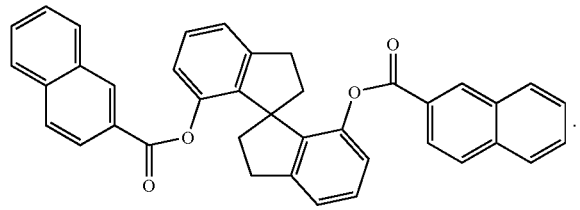

I-4

34. The article of claim 33 wherein said liquid crystalline layer further comprises a polymer binder in which domains of the liquid crystal are dispersed.

35. The article of claim 33 wherein said nematic host is chiral nematic, or ferroelectric.

36. The article of claim 33 wherein the nematic host is chiral nematic.

37. The article of claim 33 further comprising additional types of dopants.

38. The article of claim 33 wherein said substrate is transparent.

39. The article of claim 33 further comprising a transparent first conductive layer between said substrate and said liquid crystalline layer.

40. The article of claim 39 further comprising at least a second electrically conductive layer, wherein said liquid crystalline layer is between said first transparent conductive layer and said second conductive layer.

* * * * *